(12) United States Patent
Dishongh et al.

(10) Patent No.: US 8,229,057 B2
(45) Date of Patent: Jul. 24, 2012

(54) APPARATUS AND METHOD FOR NON-CONTACT SENSING USING TEMPORAL MEASURES

(75) Inventors: Terry Dishongh, Portland, OR (US); Fergal Tuffy, Donegal (IE); Benjamin Kuris, Cambridge, MA (US)

(73) Assignee: Intel-GE Care Innovations LLC, Roseville, CA (US)

( * ) Notice: Subject to any disclaimer, the term of this patent is extended or adjusted under 35 U.S.C. 154(b) by 1320 days.

(21) Appl. No.: 11/871,603

(22) Filed: Oct. 12, 2007

(65) Prior Publication Data

US 2009/0097602 A1 Apr. 16, 2009

(51) Int. Cl.
*G04F 10/04* (2006.01)
(52) U.S. Cl. .......................... 377/20; 73/866.1
(58) Field of Classification Search .................. None
See application file for complete search history.

(56) References Cited

U.S. PATENT DOCUMENTS

| | | | | |
|---|---|---|---|---|
| 4,560,889 A | * | 12/1985 | Hayashi | 327/143 |
| 5,355,397 A | * | 10/1994 | Hanson et al. | 377/56 |
| 5,369,311 A | * | 11/1994 | Wang et al. | 327/292 |
| 6,504,891 B1 | * | 1/2003 | Chevallier | 377/20 |
| 6,621,278 B2 | | 9/2003 | Ariav et al. | |
| 7,653,170 B2 | * | 1/2010 | Mattes et al. | 377/20 |
| 7,698,087 B2 | * | 4/2010 | Yamaguchi | 702/117 |
| 2011/0038451 A1 | * | 2/2011 | Tseng et al. | 377/20 |

* cited by examiner

*Primary Examiner* — Tuan T Lam
(74) *Attorney, Agent, or Firm* — Pillsbury Winthrop Shaw Pittman LLP

(57) ABSTRACT

An embodiment of the invention relates to a sampling circuit comprising at least one clock, a reference trace, a sensor trace adapted to be connected to a sensing element, and a device to measure a length of delay between a reference signal transmission time of a reference signal transmitting through the reference trace and a sensed signal transmission time of a sensed signal transmitting through the sensor trace, wherein the length of delay is determined by counting the number of burst tones occurring during the length of delay.

25 Claims, 18 Drawing Sheets

50% duty cycle          Short pulse

APPARATUS AND METHOD FOR NON-CONTACT SENSING USING TEMPORAL MEASURES

RELATED APPLICATION

None.

FIELD OF INVENTION

The embodiments of the invention relate to apparatus and method for non-contact sending using temporal measures. The invention transcends several scientific disciplines such as polymer chemistry, biochemistry, molecular biology, medicine and medical diagnostics.

BACKGROUND

Traditionally, the cost of a sensor system would increase in direct proportion to higher precision and sensitivity. U.S. Pat. No. 6,621,278 (the '287 patent) relates to a method of measuring predetermined parameters, such as temperature, acceleration, pressure, distance and other physical entities. The '278 patent, titled "High-Precision Measuring Method and Apparatus," can be applied across a variety of industries including health, communications, aviation, space, defense and automotive. The '278 patent requires a signal to be transmitted and then repeated changing of frequency signals to match a point in the initially transmitted signal.

DETAILED DESCRIPTION

Figure 1:
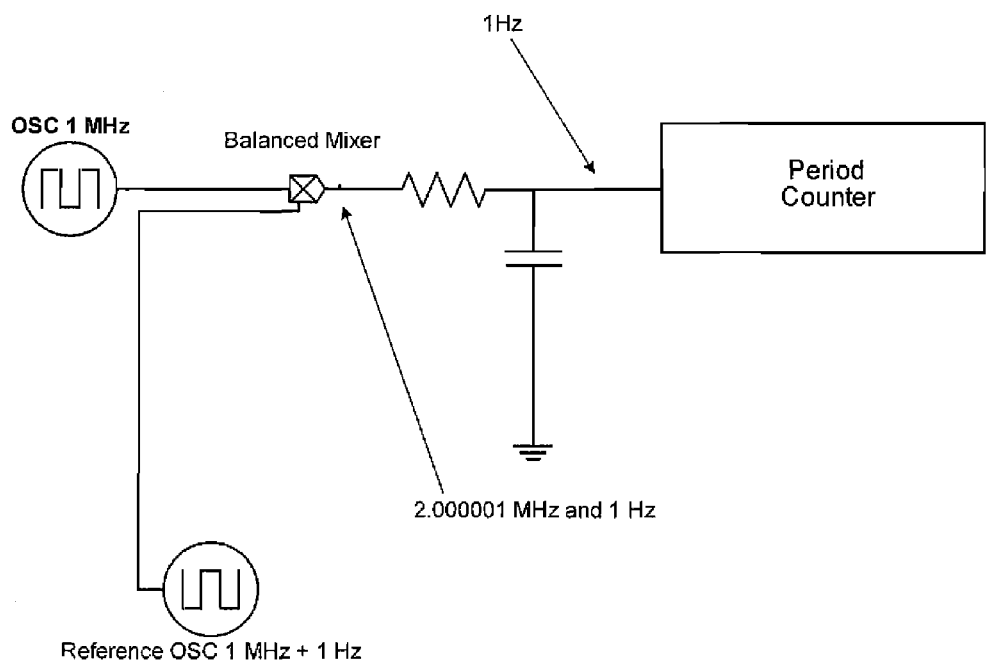
FIG. 1 shows a circuit to measure a frequency of 1 part in $10^{10}$ in one second of time.

The embodiments of the invention provide a highly-sensitive methodology for the online measurement of delay, from which human sensor parameters can be extracted. The embodiments of the invention are based upon time interval measurement where the sensor component is incorporated into one signal path to be compared with the timing of a reference signal. The embodiments of the invention provides an improvement over the '278 patent by utilizing another form of measurement, namely time-interval measurement, to identify a sensor displacement and also allowing the extraction of the data using a single pulse transmission. This means that the measurement and desired parameters can be identified from the timing of one single pulse transmission with no requirement for multiple iterations, as required in the '278 patent.

The embodiments of the invention relates to sensors and a sensor methodology whereby a nanometer (nm) change in displacement, whether through thermal or mechanical means, results in a variance in time of flight between of an electrical signal between two impedance match or temporal matched traces. The embodiments contains two electrical traces, where on is referred to as the reference trace and the other is called the sensing trace. The sensing trace is the electrical trace under test whereas the reference trace is the one in which the non-stressed signal is compared to. When both the sense trace and the reference trace are impedance match the time of flight of a signal down these two traces should arrive at the end points at the same time. By stressing the sense trace and not the reference trace a temporal variation in the arrival of the two signals can be calibrated to know displacements or temperature changes. Although in the manufacturing process actual impedance matching may no be achieved due to material imperfections, knowing the non-stressed variance in the time of flight along the two traces still can be calibrated.

The change in displacement of the sensing element is due to a change in the environmental parameters and could have tremendous potential for utilization within sensory platforms. The embodiments of the invention introduce the sensor methodology and provide initial circuit simulations to verify the principle of the proposed sensor. This is then compounded by the mathematical theory behind the interconnect displacement which then provides a feedback to the design simulations. Issues and problems that were overcome during the equivalent circuit simulations are discussed along with possible issues for deployment of the sensor network system, which is a highly sensitive sensor methodology. The outcome of this invention is the production of a data driven model to implement a standardized sensor technique based on the displacement of an interconnect wire.

The embodiments of the invention use reciprocal counting. The term "reciprocal counting" means the time difference in arrival between the sense and reference traces. One of the advantages of reciprocal counting is that it relies on the measurement of time rather than frequency. The advantage in this technology is the ability to measure burst tones (i.e., number of ticks of discrete time elements) something which a simple frequency counter cannot provide.

Figure 2:
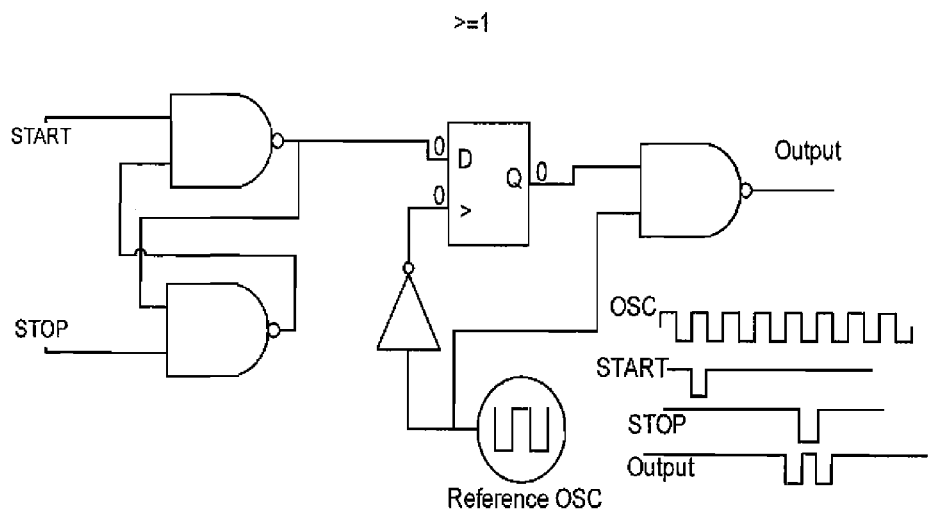
FIG. 2 shows a circuit having two circuits of FIG. 1, with their sum running through a latch.

For example, refer to the circuit of FIG. 1. In the example of FIG. 1, one can measure a frequency of 1 part in $10^{10}$ in one second of time. If one constructs two of these circuits with their sum running through a latch (an electrical circuit used to gate, invert or delay a digital signal) one would obtain the circuit shown in FIG. 2. The circuit of FIG. 2 gives a highly accurate time measure. FIG. 2 exemplifies that by combining the components of the two systems of the latch and the straight out differential clock timing as shown therein, it allows one to accurately measure the difference in frequency or number of burst tones between a reference clock and a clock that has been disturbed.

Figure 3:
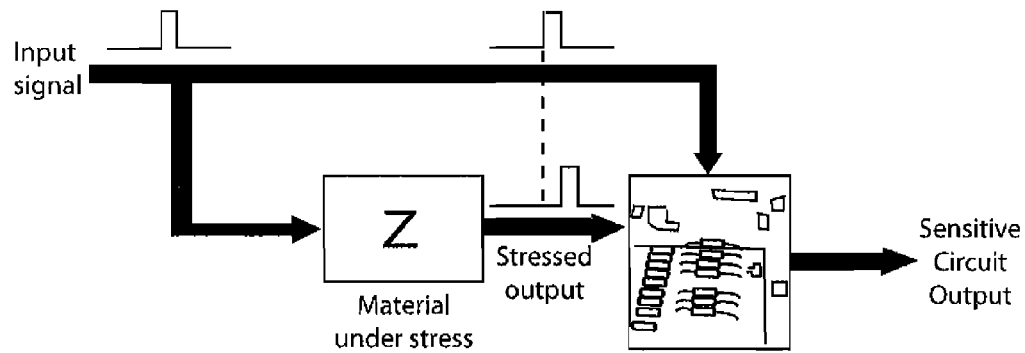
FIG. 3 shows the sensor methodology of the embodiments of this invention, wherein a reference signal is applied down a known track length that is not near the human in this case and is unaffected by the heat or vibration (and is therefore unstressed) and the same signal is also transmitted through the sensor path through the sensing element, which will then be received with a delay caused by the expansion of the heated/stressed interconnect.

The sensor methodology of the embodiments of this invention, as illustrated in FIG. 3, include a reference signal applied down a known track length which is not near the human in this case and is unaffected by the heat or vibration (and is therefore unstressed) and the same signal is also transmitted through the sensor path through the sensing element, which will then be received with a delay caused by the expansion of the heated/stressed interconnect. The sensitive circuit is designed to be able to discern the difference between the occurrences of both signals using mathematical equations, as explained below. Thus, a relationship between the heat or vibration applied to the sensing element is traced back to the human interaction, with the electronic circuit being sensitive enough to pick up the change in signal transmission time. In one embodiment, the change in the signal transmission time is measured by the number of burst tones, each burst tone having a time period of a nanosecond to picoseconds that occur during the change in signal transmission time.

In order to measure the signal transmission time of the sensed signal and of the reference signal, the system of the embodiments contains a measurement clock connected to the sensor having the sensing element and a reference clock. The device further includes a latch for summing the outputs of the two clocks. Since a burst tone of a time period of a nanosecond to picoseconds can be measured by the system of this invention, the system of the embodiments of the invention has a very high signal-to-noise ratio.

The system of the embodiments of the invention is based upon the principle that as interconnects are heated, they become stressed and expand. The system of the embodiments of the invention combine a sensor having the sensing element which could be a material capable of changing its impedance under stress (e.g., an interconnect wire or a sheet) and a sensitive sampling circuit, which together allow a mechanism for the measurement of vital signs without the need for the human to wear any sensor device. This application details the circuitry of the sensitive sampling system and explains how the sampling circuitry ties in with the interconnect wire to allow the possible extraction of human signals.

One of the features of the system and device of the embodiments of the invention is a very sensitive mechanism that allows the data coming from the stressed material to be analyzed, enabling the extraction of information that would allow the determination of the applied force or heat on the interconnect wire or some other material that is capable of changing its properties with a temperature change or under stress. The sensor in the device of the embodiment of this invention utilizes the principle of a strain gauge, whereby once the sensing element such as the interconnect wire expands, the time taken for signals to cross the path of the interconnect wire either increases of decreases, but generally increases. This increase or decrease in the time taken for the sensed signal to cross the path of the interconnect wire as compared to the reference signal is due to the change in the impedance of the interconnect wire.

There are numerous methods for measuring timing differences as needed for the system above. Frequency counting is one such solution but it is known to have precision inadequacies at low frequencies. Period or reciprocal counting on the other hand is a better method to handle the resolution issue due to a constant resolution independent of frequency. Also, reciprocal counting allows the control of the gating (or sampling) of the signal and therefore this type of counting is preferred in the embodiments of the invention.

Figure 4C:
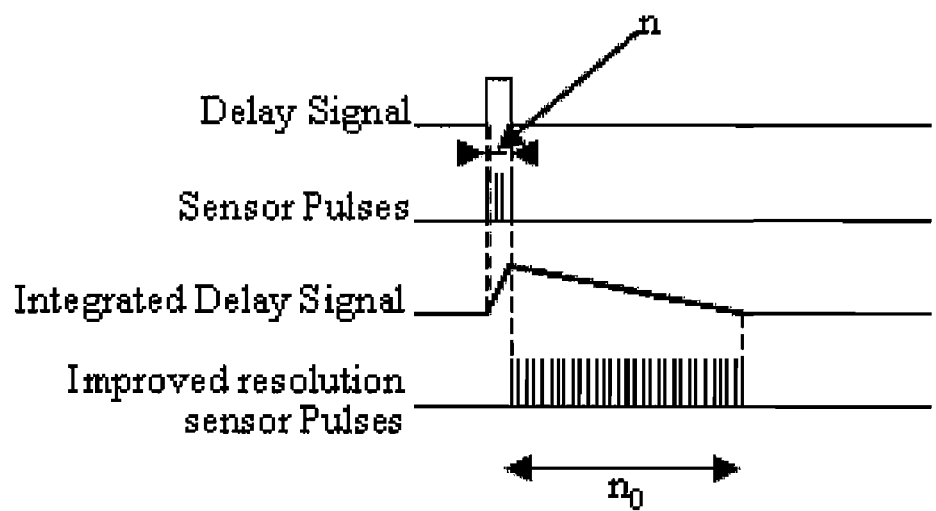
FIG. 4(c) shows input pulse timing for a specified gain in the potential integrator block.
Figure 4A:
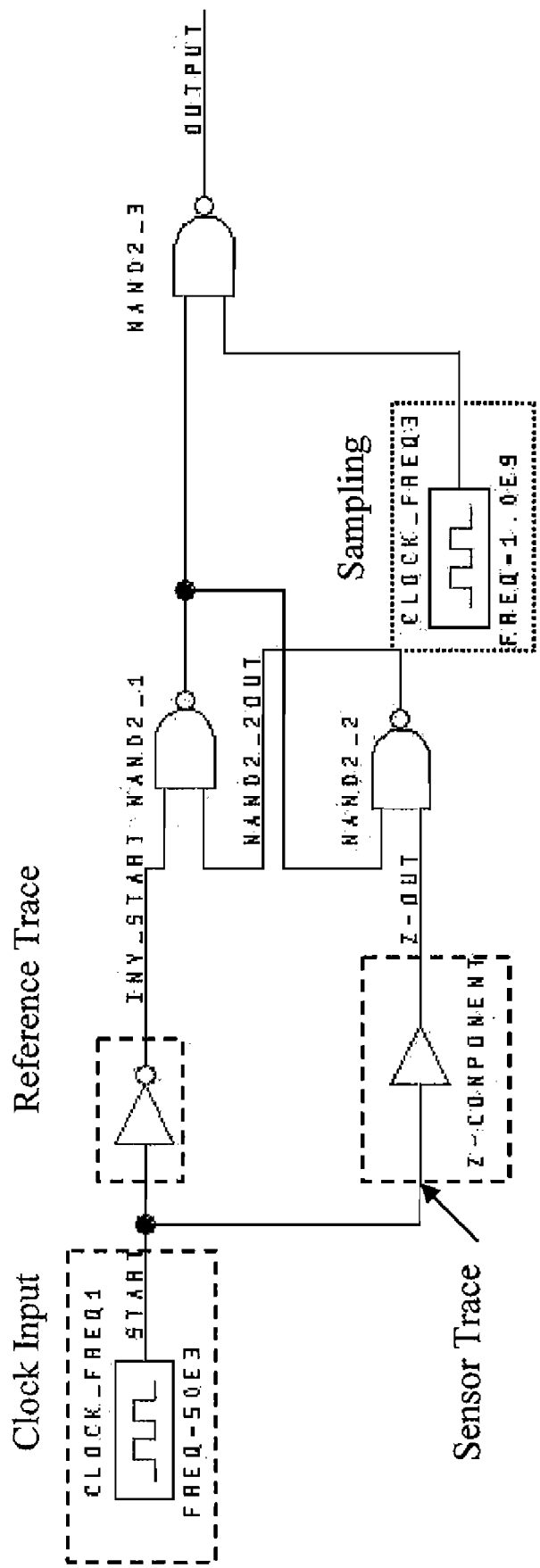
FIG. 4(a) illustrates the sampling circuit for the sensitive measurement of timing differences between the Reference Trace (also referred herein as the reference signal) and the Sensor Trace (also referred herein as the sensed signal).

An embodiment of the sensitive sampling circuit is shown in FIG. 4(a), where a clock frequency signal is used as the input signal. FIG. 4(a) illustrates the circuit for the sensitive measurement of timing differences between the Reference Trace (also referred herein as the reference signal) and the Sensor Trace (also referred herein as the sensed signal). The two NAND are configured as an SR latch. NAND is a logic gate that produces an output that is the inverse of the output of an AND gate. AND is a basic logic gate that outputs a 1 (or ON) only if both inputs are a 1 (or ON), otherwise outputs a 0. While the systems shown in FIG. 3 and FIG. 4(a) have one input supplying both signal paths, other embodiments could uses two separate input sources.

A latch is a kind of bistable multivibrator, which is an electronic circuit which has two stable states and thereby can store one bit of information. The word latch refers to simple transparent storage elements and more advanced non-transparent (or clocked) devices, which are often described as flip-flops. A circuit incorporating latches has state; its output may depend not only on its current input, but also on its previous inputs. Such a circuit is described as sequential logic. A SR latch is a type of latch where S and R stand for set and reset inputs. Normally, in storage mode, the S and R inputs are both low, and feedback maintains the Q and Q* outputs in a constant state, with Q* the complement of Q. If S (set) is pulsed high while R is held low, then the Q output is forced high, and stays high when S returns low; similarly, if R (reset) is pulsed high while S is held low, then the Q output is forced low, and stays low when R returns low.

Figure 4B:
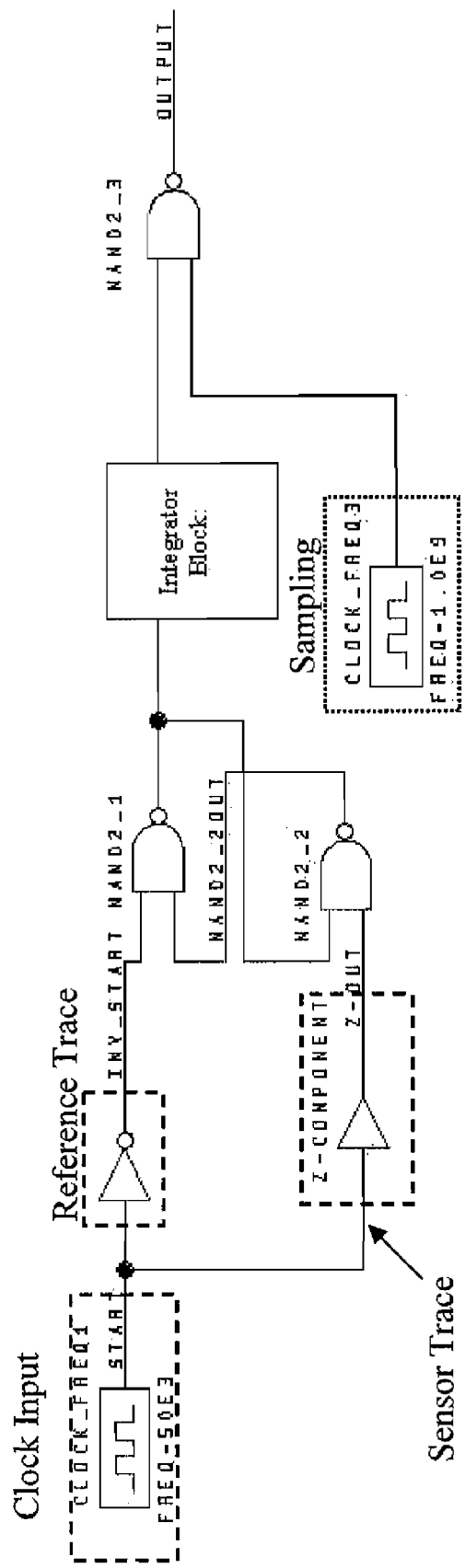
FIG. 4(b) shows an embodiment of the sampling circuit further including a potential integrator block.

Another embodiment of the sensitive sampling circuit of FIG. 4(a) is shown in FIG. 4(b), wherein the circuit further includes a potential integrator block. If the signal at the output of the SR latch of FIG. 4(a) is applied to some type of an integrator, as shown in FIG. 4(b), then it would be possible to extrapolate the length of the delay between the reference signal transmission time and the sensed signal transmission time and achieve further precision on an integrated discharge signal, as shown in FIG. 4(b). The purpose of the potential integrator block is to extrapolate the length of the delay between the reference signal transmission time and the sensed signal transmission time. If the integrator constant was set to 100, as in FIG. 4(c), then the accuracy could be further increased by a factor of 100.

Figure 5:
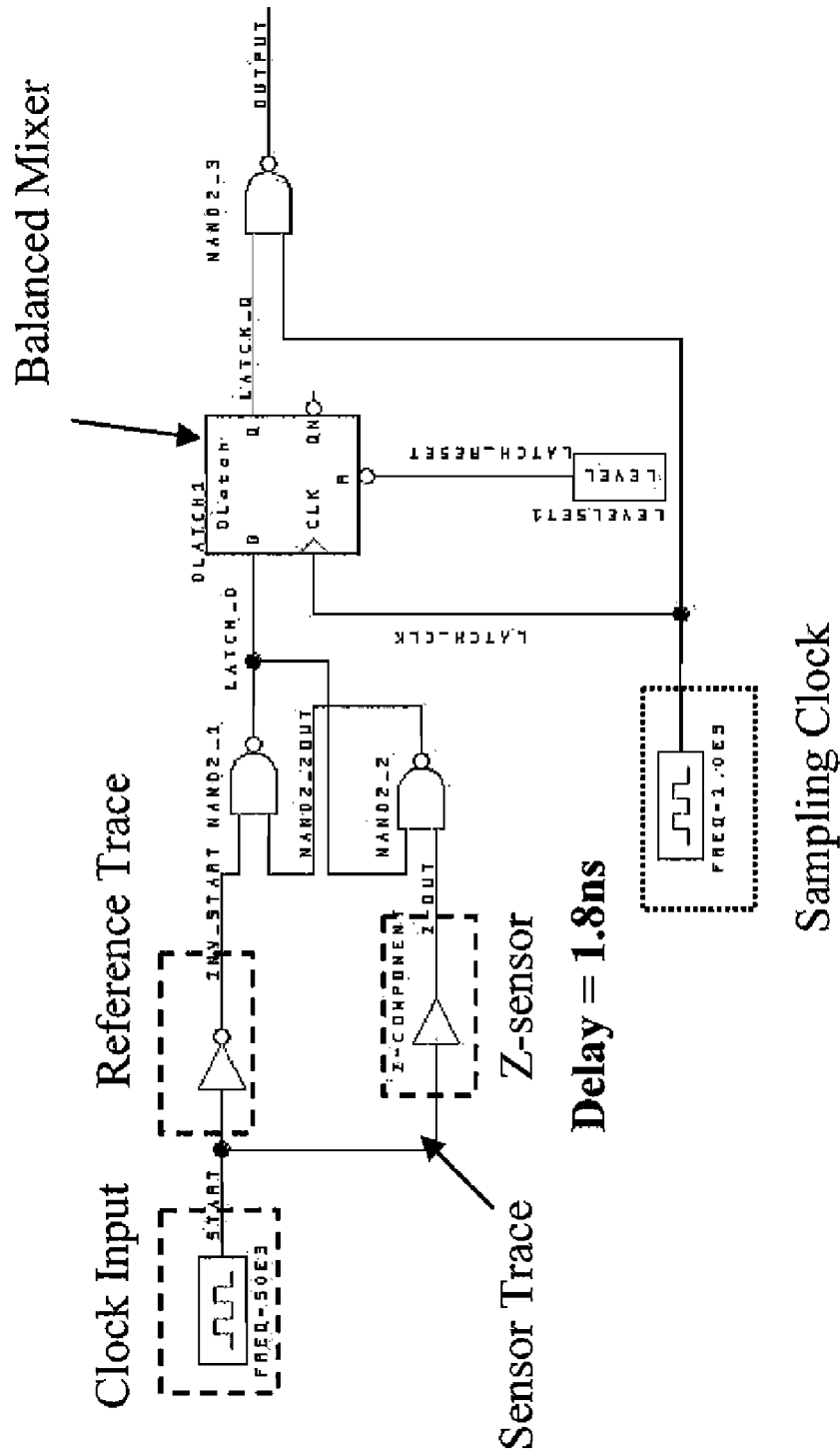
FIG. 5 shows a simulated sampling circuit wherein the signal delay time is 1.8 ns.
Figure 6A:
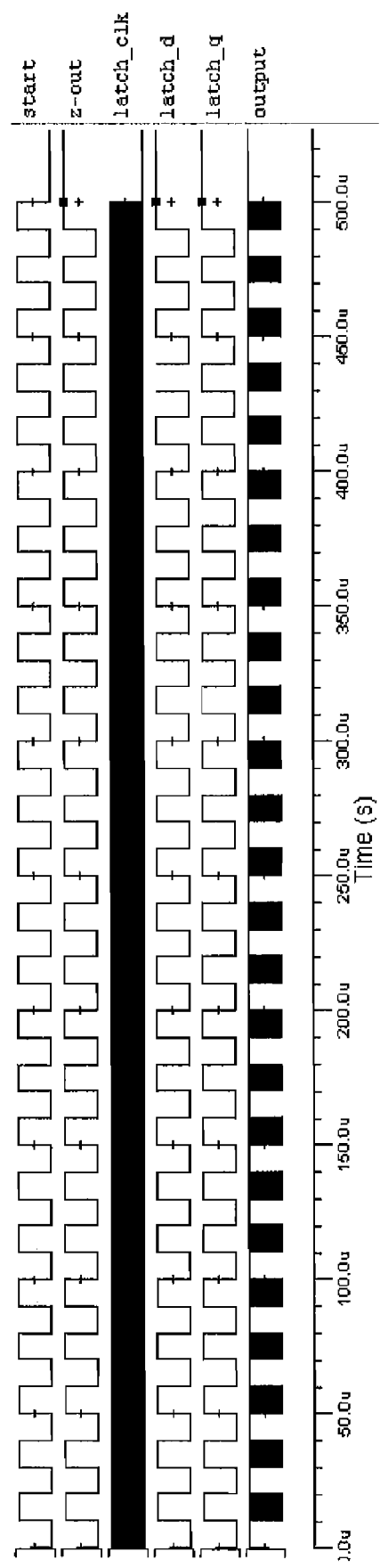
FIGS. 6 (a) and (b) show the signal outputs of FIG. 5 where FIG. 6 (b) is a zoomed view of FIG. 6 (a).
Figure 6B:
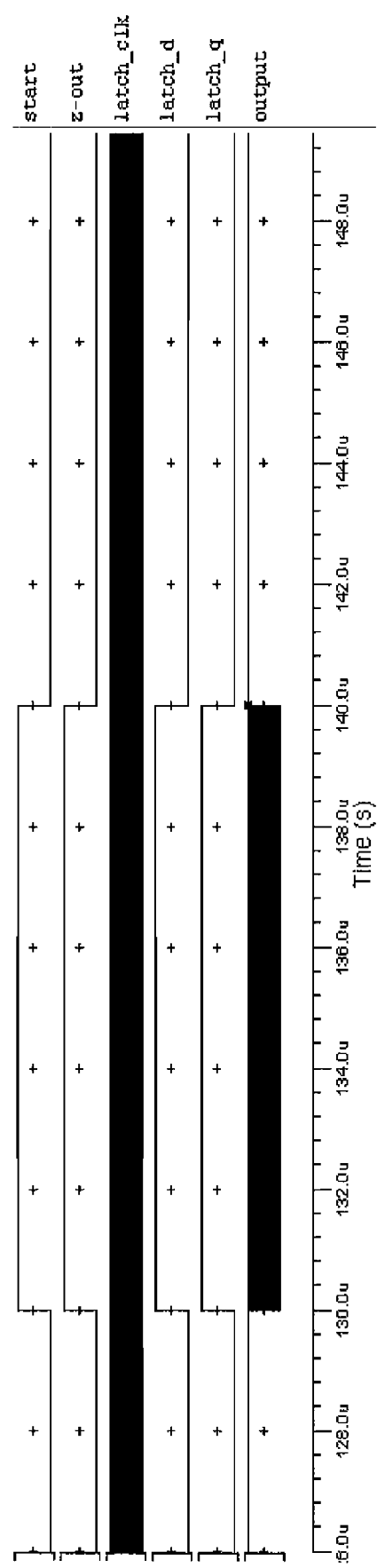

One embodiment of the sensitive sampling circuit wherein the signal transmission delay is 1.8 ns is shown in FIG. 5. This delay has been incorporated into the Z-component of the Z-sensor line, of FIG. 5, which therefore induces an error between both inputs to the SR-latch. The input signal (start) is applied with a frequency of 50 KHz which has two interconnect routes, one which is the reference line that goes into an inverter, which in turn enters the SR latch, and the other route goes to the sensor line which will be stressed. The balanced mixer in FIG. 5 allows the two clocks to be integrated. The affect of the signal transmission delay can be seen in the timing diagrams of FIGS. 6 and 7, where FIG. 6 illustrates a 500 μs simulation of FIG. 5, where the start pulse is the direct (reference) 50 KHz signal. The z-out signal is the delayed signal after being disturbed by the sensor, this delay is so small however that it cannot be seen in either FIGS. 6 (a) and (b), which show that the output signals should preferably be highly focused (zoomed) to view the delay between the signals, as in FIGS. 7 (a) and (b).

One of the considerations in the design of the sampling circuit of the embodiments of the invention is the effect of the AC and DC resistance $R_{AC}$ and $R_{DC}$. The DC resistance is defined as:

$$R_{DC} = \frac{\rho L}{Wt} \quad \text{(Eq-1)}$$

Figure 8:
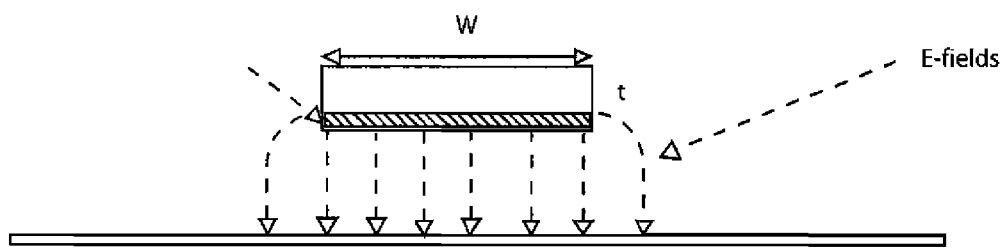
FIG. 8 shows a microstrip that has a frequency dependant resistance $R_{AC}$.

There are no frequency/time elements with which the displacement can be related to time change, i.e. delay. FIG. 8 shows a microstrip line and the $R_{AC}$ of the microstrip line can be characterized by the formula $$R_{AC} = L\frac{\sqrt{\rho\pi\mu f}}{W} \quad \text{(Eq-2)}$$

Where
L is the microstrip line length
ρ is the resistivity
μ is the permittivity
f is the signal frequency
W is the wire width
Solving for the frequency, f, recasts this to $$f = \frac{R_{AC}^2 W^2}{L^2} \times \frac{1}{\rho\pi\mu} \quad \text{(Eq-3)}$$

With $$f = \frac{1}{T},$$

Eq-3 can be re-written as $$T = \frac{L^2}{R^2 W^2}(\rho\pi\mu) \quad \text{(Eq-4)}$$

Where T is the time.

$$L' = L + \Delta L \quad \text{(Eq-5)}$$

$$W' = W + \Delta W \quad \text{(Eq-6)}$$

$$\varepsilon_L = \frac{\Delta L}{L} \quad \text{(Eq-7)}$$

$$\varepsilon_W = \frac{\Delta W}{W} \quad \text{(Eq-8)}$$

$$\varepsilon_L = \upsilon(\varepsilon_W) \quad \text{(Eq-9)}$$

$$L' = (1 + \varepsilon_L)L \quad \text{(Eq-10)}$$

-continued $$\Delta W = \varepsilon_W W = \frac{\varepsilon_L}{\upsilon}W \quad \text{(Eq-11)}$$

$$W' = W + \frac{\varepsilon_L}{\upsilon}W = \left(1 + \frac{\varepsilon_L}{\upsilon}\right)W \quad \text{(Eq-12)}$$

$$\Delta T = \frac{L'^2}{R^2 W'^2}(\rho\pi\mu) \quad \text{(Eq-13)}$$

$$\Delta T = \frac{(1+\varepsilon_L)^2 L^2}{R^2\left(1+\frac{\varepsilon_L}{\upsilon}\right)^2 W^2}(\rho\pi\mu) \quad \text{(Eq-14)}$$

If the track length, L=8 cm (i.e. $8\times10^{-2}$) and the change in length ΔL=10 nm (i.e. $1\times10^{-8}$) therefore $$\varepsilon_L = \frac{1.0\times10^{-8}}{8\times10^{-2}} = 1.25\times10^{-7} \quad \text{(Eq-15)}$$

From the Poisson effect, where the change in width, W, is small relative to the change in length and substituting Eq-15 into Eq-14, a time delay ΔT of 1.8 nsecs can be calculated. This shall be incorporated into the system simulations of section 4. By examining equation 15 one can see that the small strain can be sensed. Subsequently from equations one and two one can see the temporal elements of the physical impedance changes are a function of only the AC effect, ergo the technology is independent of manufacturing variations in impedance control. In one embodiment, mathematical derivation of a change of displacement of 10 nm corresponds to a delay value of 1.8 ns. This delay value has been incorporated into the Z-component of the Z-sensor line of FIG. 5.

Figure 7A:
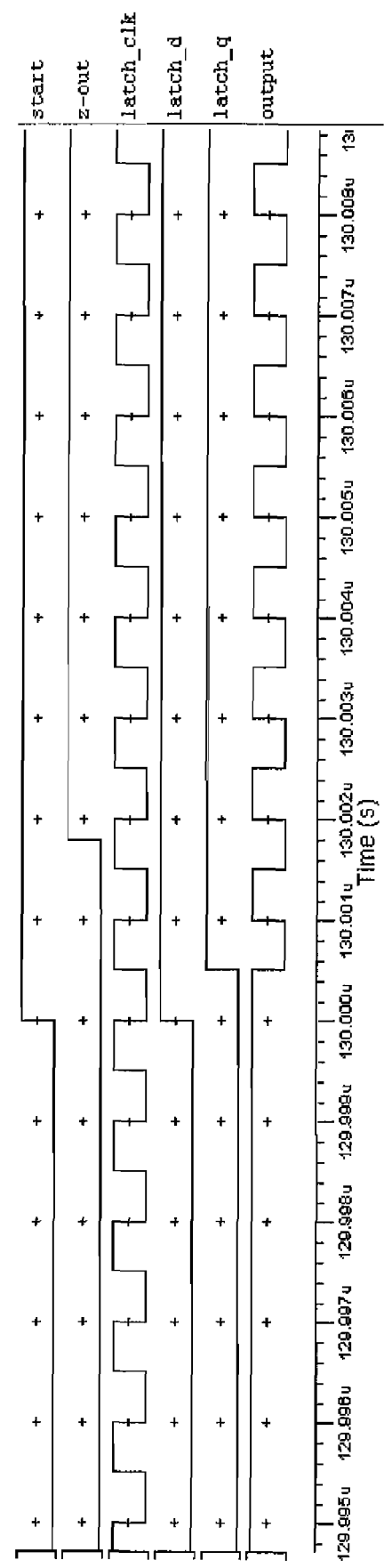
FIGS. 7 (a) and (b) show a zoomed view of FIG. 6, showing the beginning and end of the start pulse.
Figure 7B:
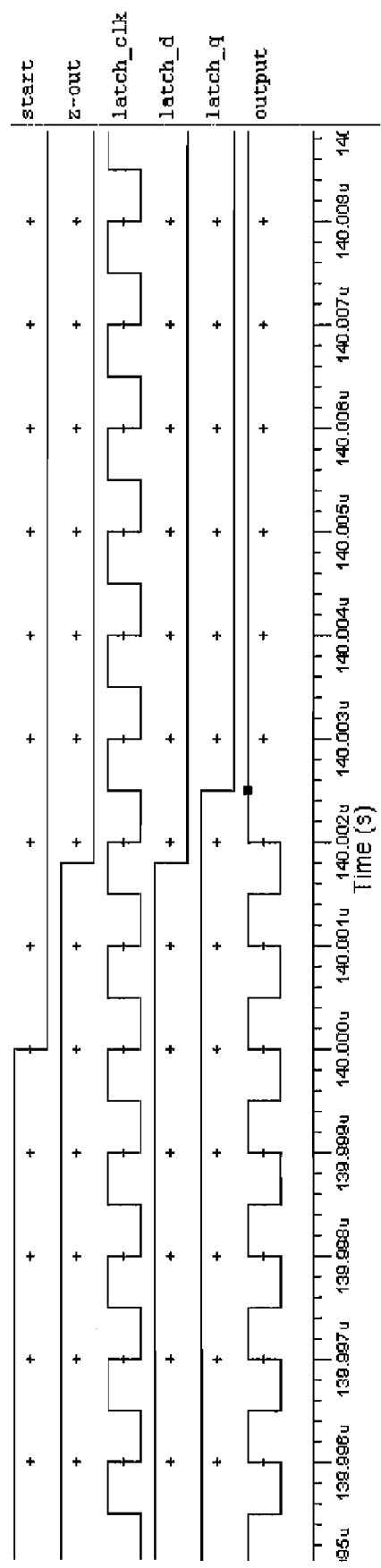

The signal output, for example, as shown in FIGS. 6 (a) and (b), shows the operation of the system where instead of having pulses solely representative of the delay the pulses represent the rising edge of the start pulse to the falling edge of the z-out signal. To therefore calculate the delay a calculation will have to be done by the microprocessor, this will be;

$$Z_{delay}=\text{Time}_{Overall}-\text{Time}_{Known} \quad \text{(Eq-16)}$$

where $Z_{Delay}$ is the delay caused from the sensor line, $\text{Time}_{Overall}$ is the total number of output pulses (i.e. caused by the whole pulse i.e. from the beginning of the start pulse to the end of the z-out pulse), this will be calculated by the number of pulses multiplied by the period of the clock signal, i.e., for 1 GHz clock as shown in FIGS. 7 (a) and (b) this will be $$\text{Time}_{Overall}=N_{Pulses}*1\times10^{-9} \quad \text{(Eq-17)}$$

and $\text{Time}_{Known}$ is the known length of the start pulse.

The embodiments of this invention produce excellent sensitivity of the sampling circuit for the application of high-resolution sensing of human signals. Some of the features of the sampling circuit and potential issues are the following.

Consideration should be given to the type of pulse (clock) input, i.e. the START pulse of FIG. 5. If the input is a 50% duty cycle clock input as in FIG. 9, and both start and stop pulses overlap, the calculation of Eq-16 and Eq-17 will have to be computed in the microprocessor. If however the case was that a very quick pulse was transmitted, where the start pulse had taken place before the stop pulse, then a much simpler calculation could be performed, as in Eq-18.

$$\text{Time}_{Delay}=N_{Pules}*1\times10^{-9} \quad \text{(Eq-18)}$$

The sensitivity of the system is dependant upon the frequency of the sampling clock. Therefore, the higher the frequency the greater the sensitivity, ideally this should be as high a frequency as possible.

The microprocessor/counter should preferably also be able to operate with at least the same frequency as the sampling clock.

The time difference between the input and Z-sensor pulses will be given by the formulae $$T_{Delay} = Time_{Overall} - Time_{Known}$$

or $T_{Delay} = N_{Pulses} * 1 \times 10^{-9}$

When the sensitive sensing circuit is fabricated, there could be a mismatch in timing between the reference line and the delayed sensor even before any signal is sensed due to the different line lengths, as shown in FIG. 5. In one embodiment, this is considered by calibrating the system initially with no temperature/stress applied to the sensing interconnect line.

There are a few variations by which the resolution and hence sensitivity of the system could be further improved upon. Firstly, for example, in the system of FIG. 5, delay result will be available roughly every 20 μseconds (1/50 KHz). Then, depending on the availability of a microprocessor or pulse counter with this speed of operation, if this was averaged over a time period of for example 0.5 seconds an increase in precision could be achieved.

Secondly, if the signal at the output of the SR latch could be applied to some type of an integrator, then it may be possible to extrapolate the length of the delay pulse and achieve further precision on an integrated discharge signal. If the integrator constant was set to 100, then the accuracy could be further increased from that in Eq-19 to that in Eq-20 as shown. This in itself will create issues as start and stop pulses will only be allowed to be sent after the improved sensor resolution pulse line has finished pulsing, i.e. after the end of no.

$$\tau_{Delay} = T_{CLOCK} * n \quad \text{(Eq-19)}$$

$$\tau_{Delay} = T_{CLOCK} \frac{n_0}{100} \quad \text{(Eq-20)}$$

In Eq-19 and Eq-20, n is the number of sensor pulses (i.e., burst tones) in the true signal delay and no is the number of sensor pulses in the extrapolated signal delay as shown in FIG. 4 (c).

Figure 9:
FIG. 9 shows input pulse timing.
Figure 10:
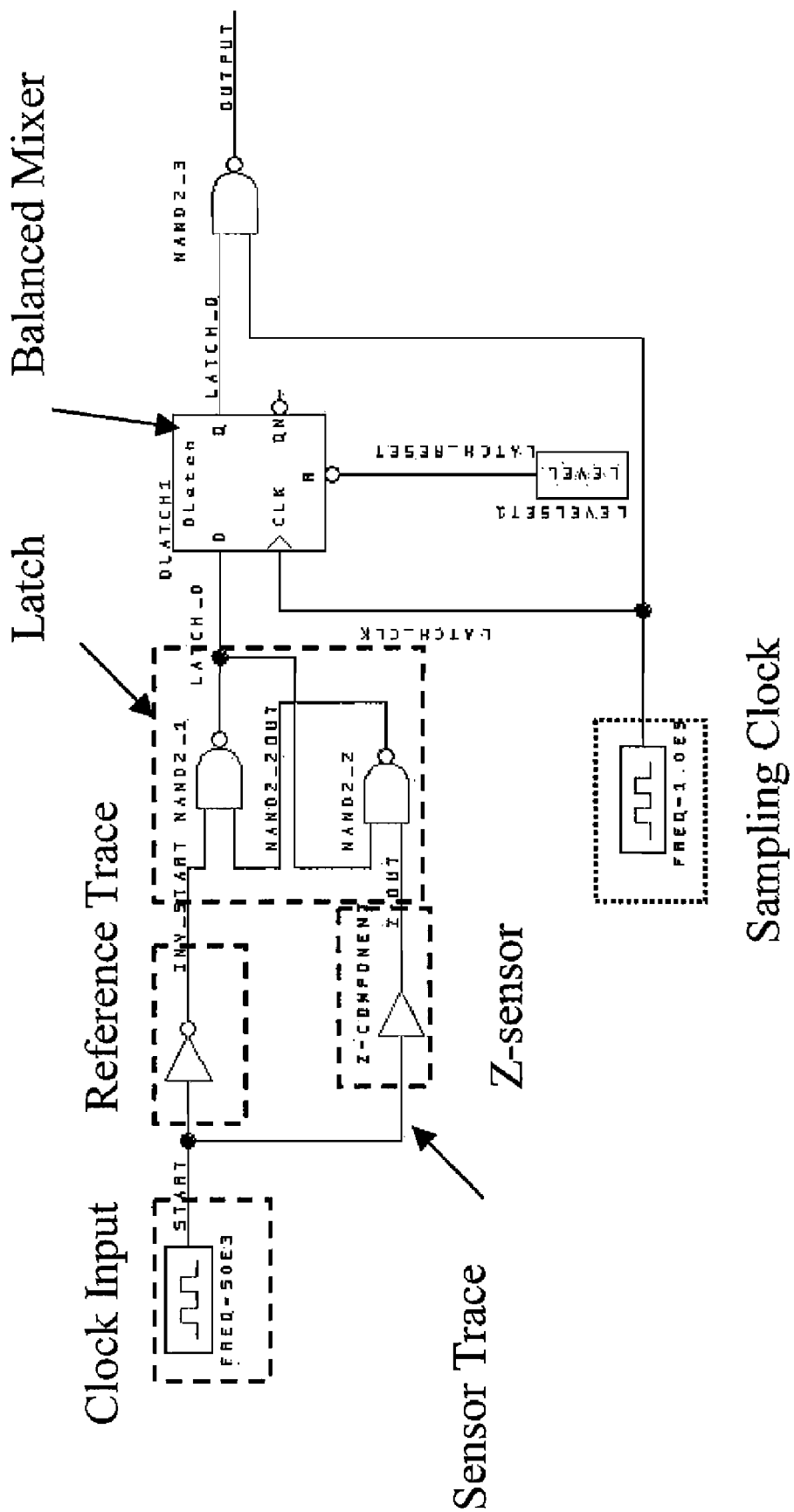
FIG. 10 shows a reduced sampling circuit with insertion of clock frequency supply to reduced sampling circuit.
Figure 11A:
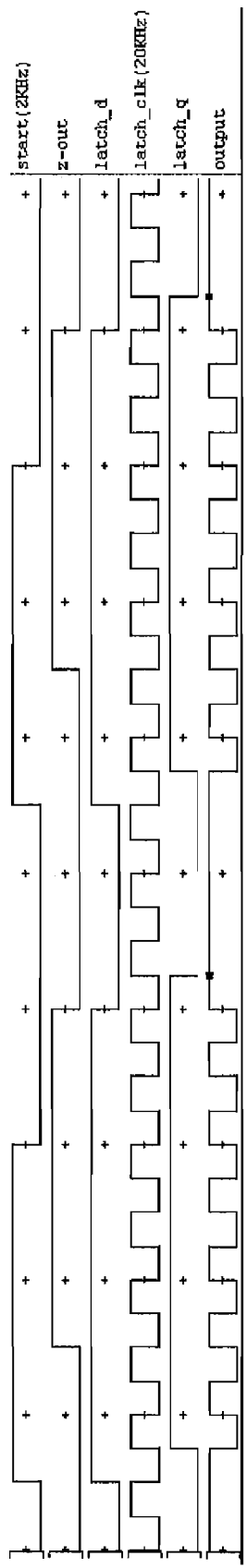
FIG. 11 shows the reduced sampling circuit outputs of the reduced sampling circuit of FIG. 10.
Figure 11B:
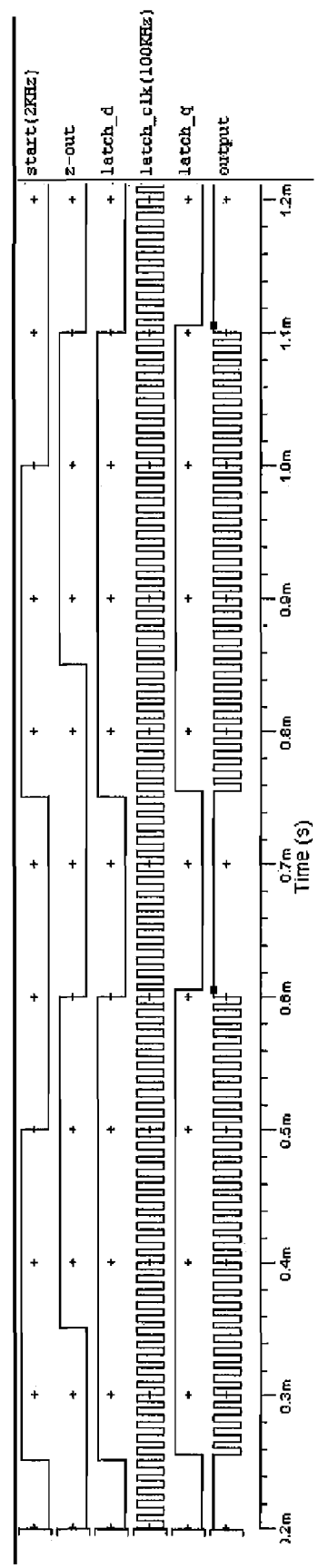

In one of the embodiments, the pulse generator could be a 50:50 (duty cycle) clock input shown in FIG. 9, and the sensitive sensing circuit could be as illustrated in FIG. 10. FIG. 11 plots the results of the simulation of FIG. 10 and this shows the delay between the clock input, start (2 KHz), and the same signals after passing through the Z-sensor, z-out. The main difference between FIG. 11 (a) and FIG. 11 (b) is that the sampling clock frequency is increased giving greater sensitivity.

Figure 12:
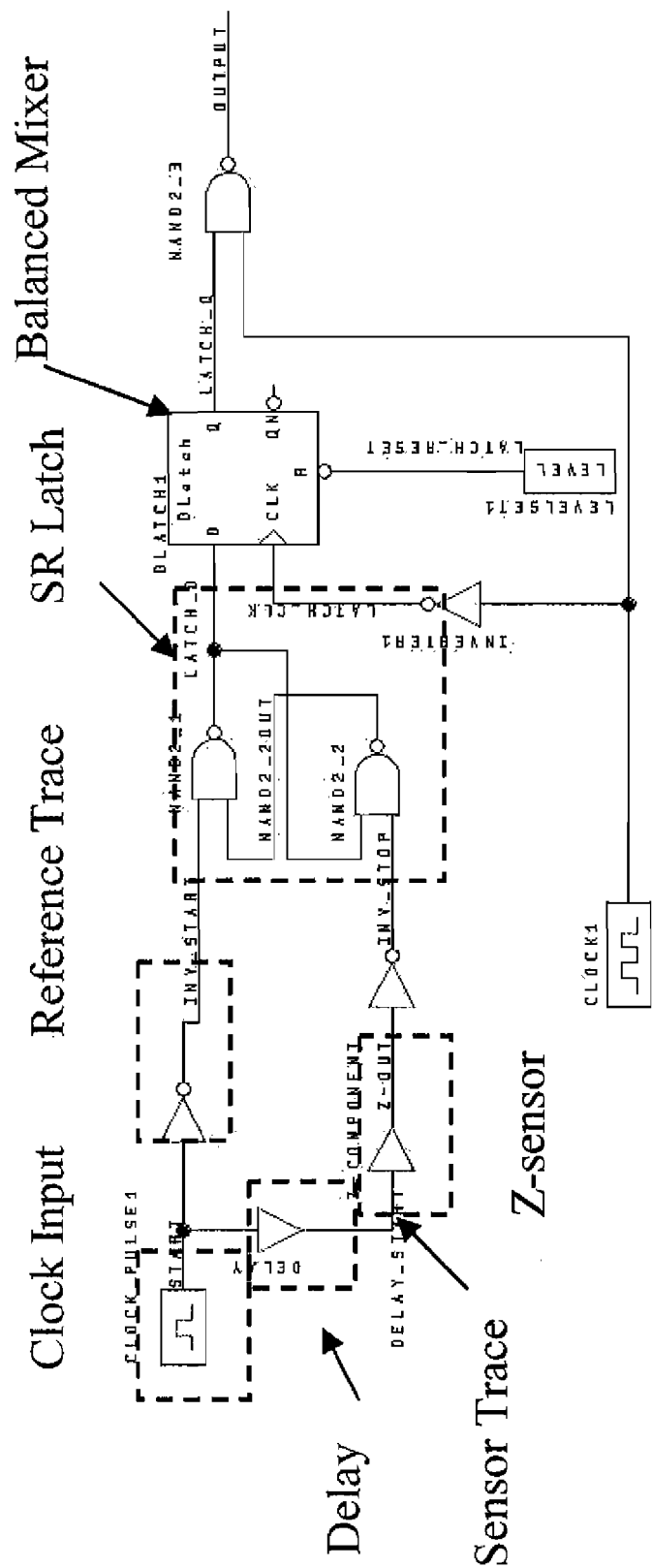
FIG. 12 shows a sampling circuit from single clock pulse input.

One embodiment of the sensitive sampling circuit includes a delay that was initially inserted in the stop pulse interconnect to ensure that the stop pulse could not take place until after the start pulse had switched off. This is illustrated in FIG. 12 where the high-precision sensor circuit has further evolved, where same source, CLOCK_PULSE1, supplies both the start and stop inputs of the SR latch, albeit the stop signal is firstly delayed (as indicated by the dashed green box) and then by the amount of the Z-sensor which is the material being affected by the change is temperature/stress. The output pulses, output, of the d-latch would then be fed into a microprocessor which would know the CLOCK_PULSE1 length (i.e., start length) and the respective number of pulses it would create, which is dependant upon the clock signal CLOCK1, and thus by subtracting the expected from the overall give a number of pulses in respect of the time delay of the Z-block. The microprocessor would then calculate the delay using pre-defined instructions.

In yet another embodiment, it was possible to reduce system components by removing the delay component and also the inverter at the stop terminal. The inverter connecting the CLOCK1 signal to the CLK port of the d-latch was also removed to switch the latch_q on earlier in the latch_d input signal.

Figure 13:
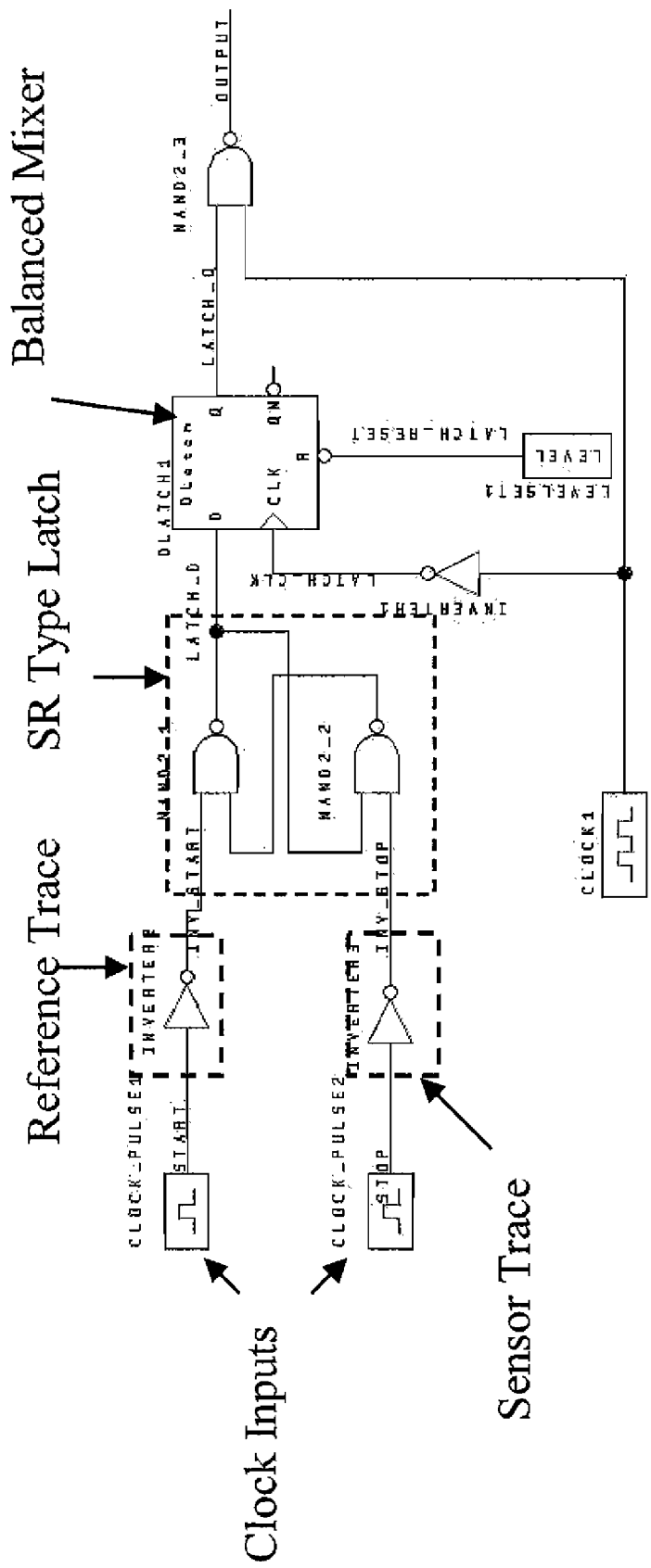
FIG. 13 shows a sampling circuit from dual clock pulse input.

Another embodiment of the invention relates to the sensitive sampling circuit of FIG. 13, where a clock signal is used as the input signal. FIG. 13 illustrates the circuit for the sensitive measurement of timing differences between CLOCK_PULSE1 and CLOCK_PULSE2, provided the CLOCK_PULSE1 occurs first. The dashed box surrounds the two NAND which are configured as an SR latch. While the circuit shown in FIG. 12 has one input supplying both signal paths, the circuit of FIG. 13 uses two separate sources to help visualize the operation of the system.

Figure 14A:
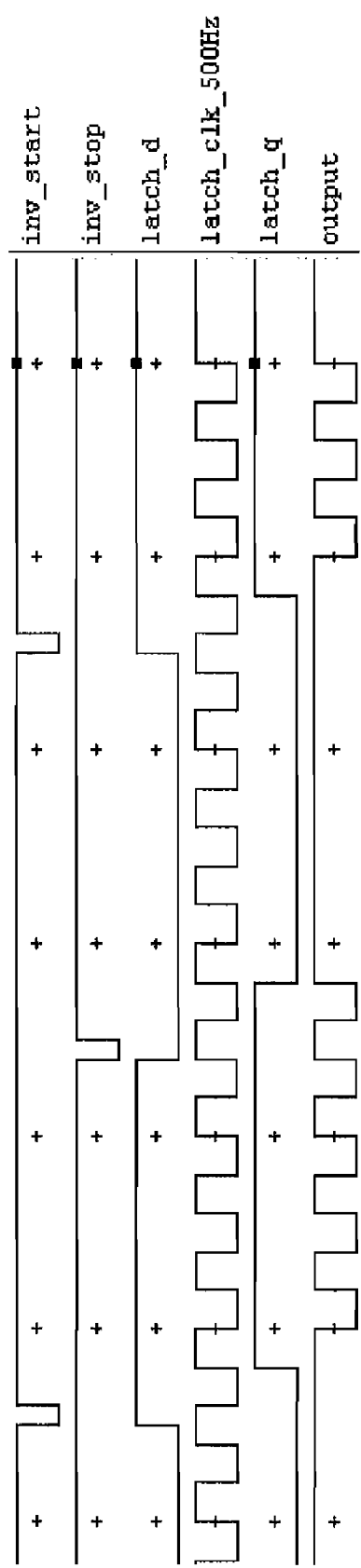
FIG. 14 shows the waveforms generated by the sampling circuit shown in FIG. 13.
Figure 14B:
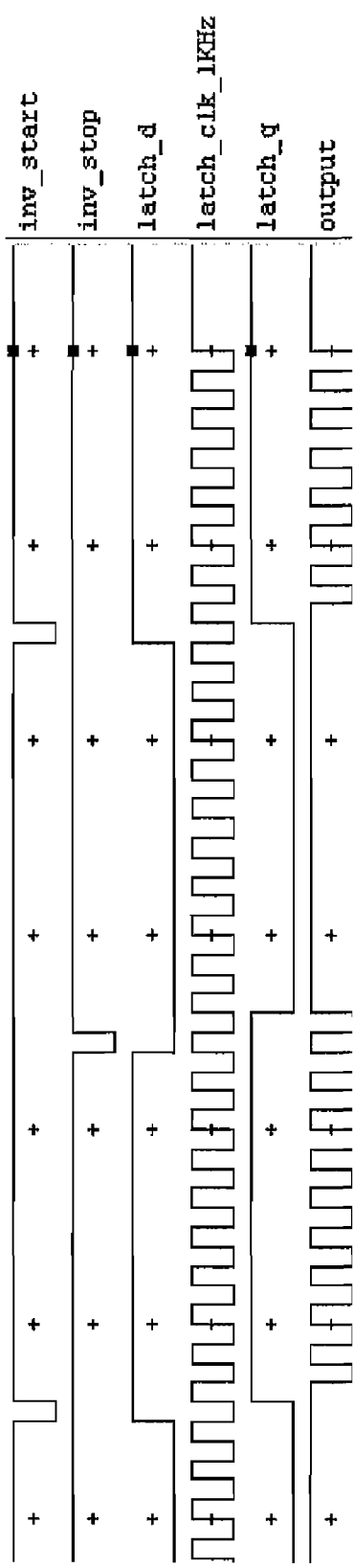
Figure 14C:
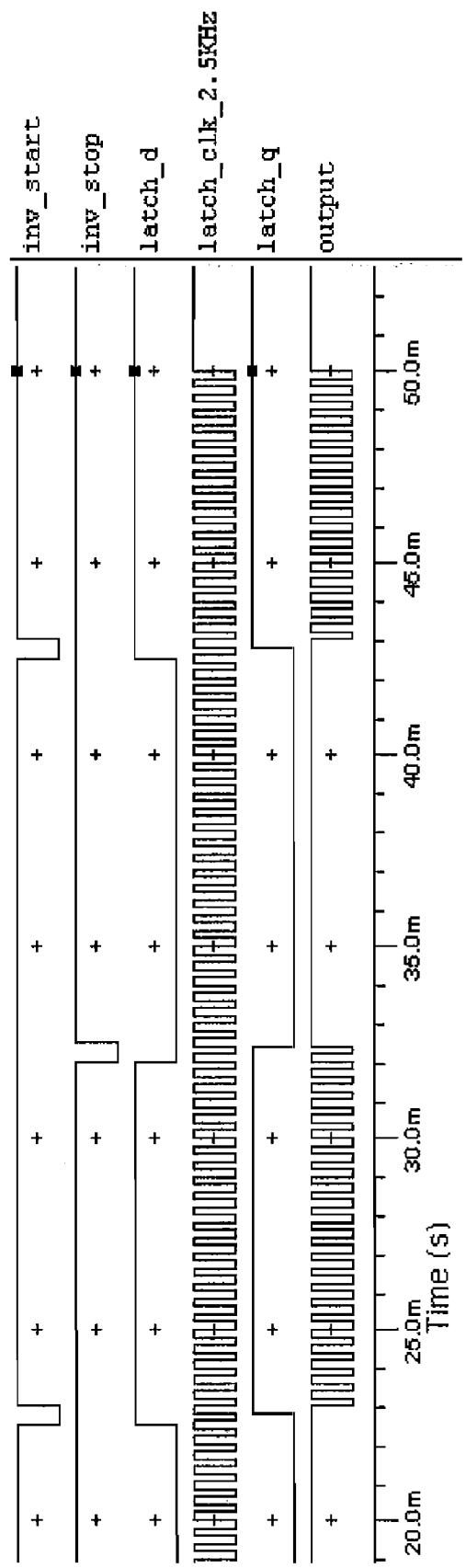
Figure 15:
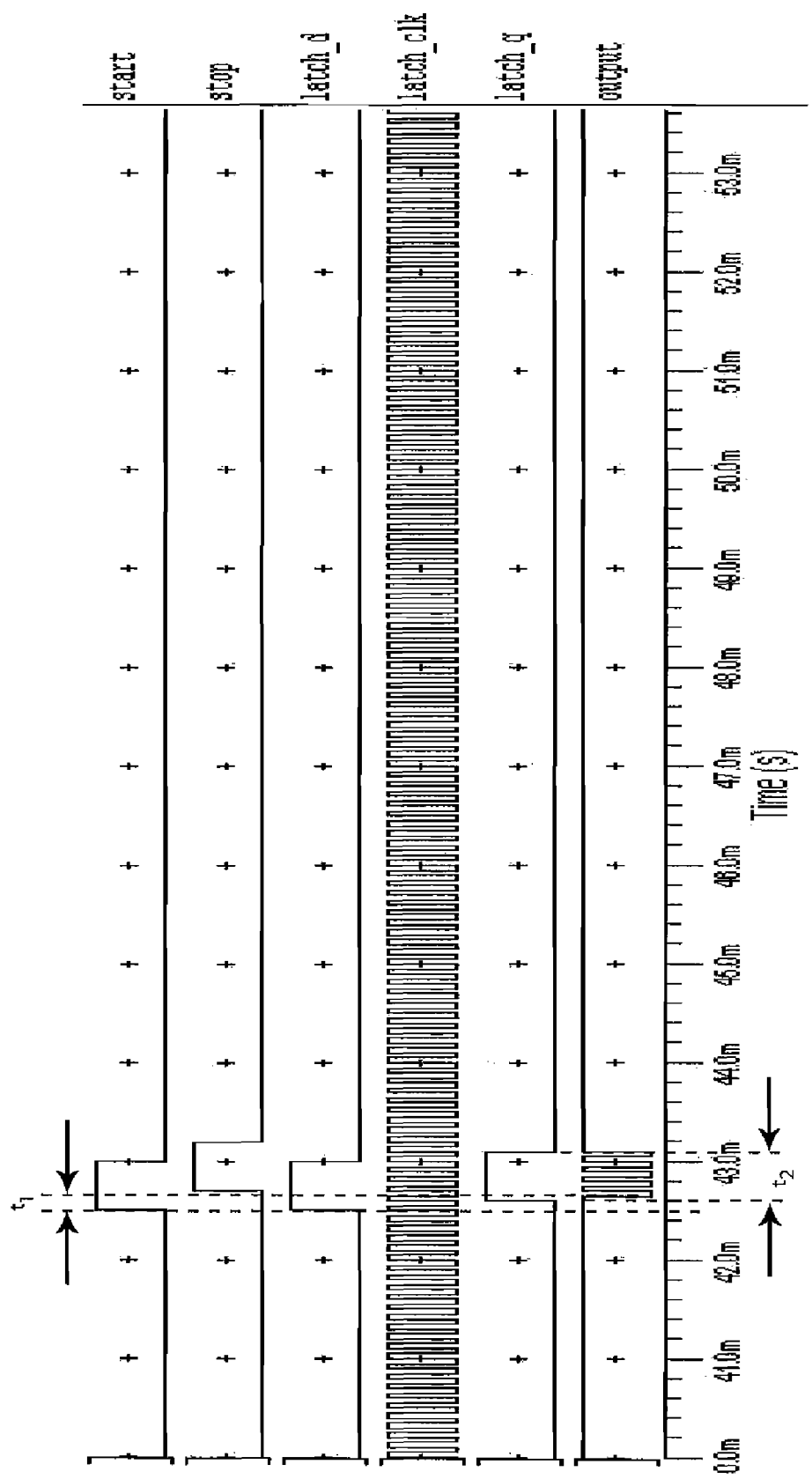
FIG. 15 shows the effect of reducing the time between pulses, i.e. reducing the delay (Z).

FIG. 14 shows some the system waveform outputs from a segment of a simulation between 20 ms and 50 ms. CLOCK_PULSE1 and CLOCK_PULSE2 generate start and stop pulses to set and reset the inputs of the SR Latch. The SR latch operation is well known in the art, for example, see "Analogue and Digital Electronics," Chapter 10, Warnes, 1998. This provides a pulse whose length corresponds to the delay between the leading edge of both pulses. This pulse is then fed into the "D-input" of a d-latch, the d-latch accesses it's d-input on every rising clock edge and transfers the input value to its output terminal (Q). The d-latch prevents timing irregularities, such as runt pulses, and synchronizes the system. The d-latch output (latch-q) provides one input to an AND gate with the other input being connected to the d-latch clock input, CLOCK1. This provides a series of pulses, corresponding to the frequency of CLOCK1, which would then be counted by a frequency counter or microprocessor. In FIGS. 14 (a), (b) and (c), a total of 3 simulations have been completed where the CLOCK1 input has been varied across each simulation, 500 Hz, 1 KHz and 2.5 KHz respectively. The outputs signals (output) from the three circuit simulations showed that greater accuracy could be achieved by setting the CLOCK1 input to a higher value. While the previous simulations proved adequate thus far, alternative scenarios were investigated. One such scenario is shown in FIG. 15, where the delay between the pulses, $t_1$, was relatively small and the stop pulse occurred during the start pulse. Instead of the number of pulses representing $t_1$, it can be seen that the sensor output represented the length of the start pulse as shown by $t_2$. This was due to a fundamental rule in sequential logic circuits that both inputs of the SR latch cannot simultaneously be high, this is a forbidden state as is well known in the art; see "Analogue and Digital Electronics," Chapter 10, Warnes, 1998.

Figure 16:
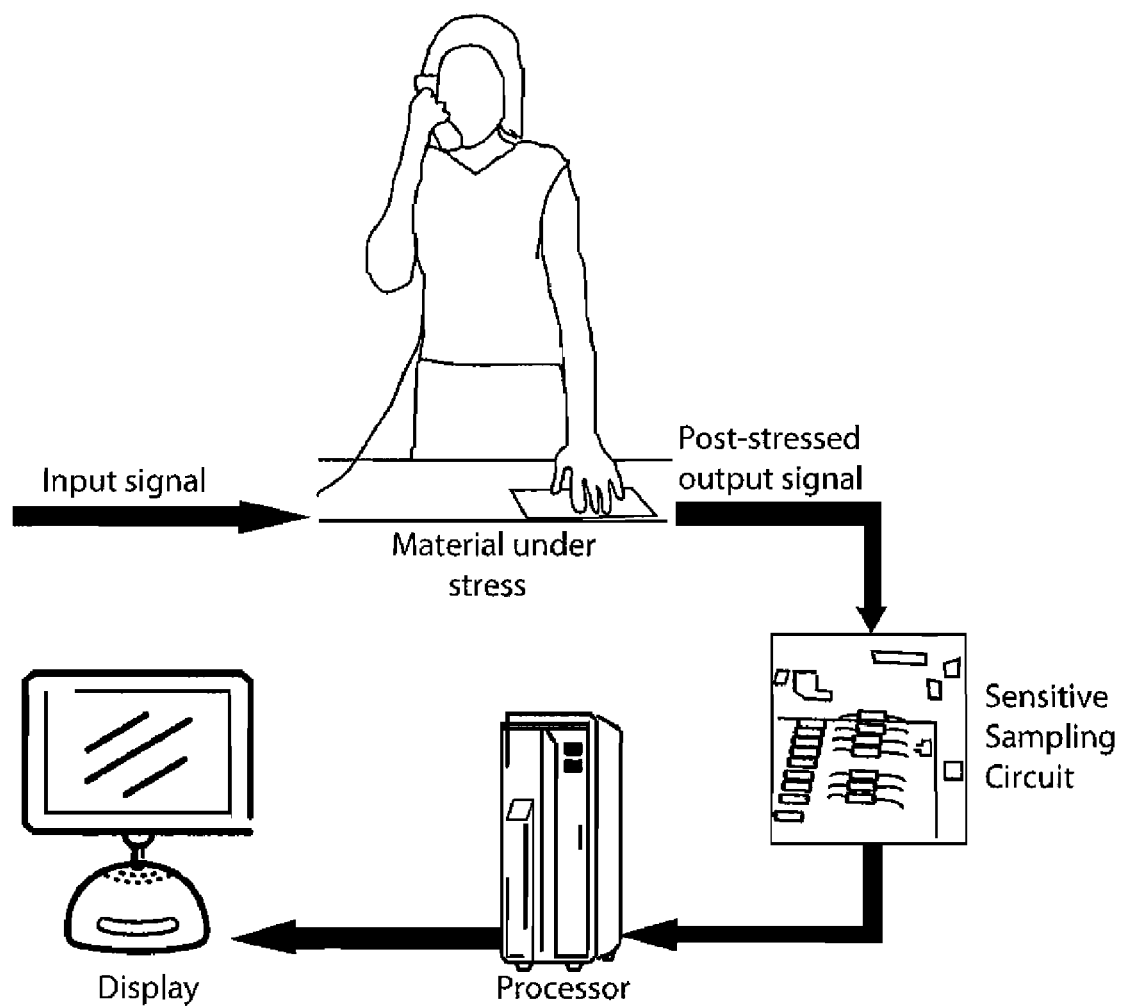
FIG. 16 shows an overview of the sensor system in operation in one embodiment of the invention.

Finally, FIG. 16 shows an overview of the sensor system wherein a person is in contact with a sensor that could be located on a below a table, for example. The technology of the present invention will lead to remote sensing devices that can provide readings from several feet away without physical contact. That is, the remote sensors could do away with heart monitor straps etc. Instead, the remote sensor devices of the embodiments of this invention could get a signal from a person through a wireless transmitting device attached to the person.

The embodiments of the sensor system of the invention could be used for measuring both temperature and vibrations. Temperature effect on the sensor system of the invention are steady state effect. Thus, the temperature measurement is done by determining the difference in the signal transmission time of the reference signal and the sensed signal. On the other hand, vibrational effect on the sensor system of the invention have a frequency component that is different in the reference signal and the sensed signal. These frequency components are distinguished by Fourier Transform.

Another distinction between the sensor systems for temperature and vibration measurement is that the Z-sensor of the sensor systems for temperature has be to a separate sensing element from the reference trace, while this is not required for vibration sensor system.

This application discloses several numerical range limitations that support any range within the disclosed numerical ranges even though a precise range limitation is not stated verbatim in the specification because the embodiments of the invention could be practiced throughout the disclosed numerical ranges. Finally, the entire disclosure of the patents and publications referred in this application, if any, are hereby incorporated herein in entirety by reference.

The invention claimed is:

1. A sampling circuit comprising at least one clock, a reference trace, a sensor trace adapted to be connected to a sensing element, and a device to measure a length of delay between a reference signal transmission time of a reference signal transmitting through the reference trace and a sensed signal transmission time of a sensed signal transmitting through the sensor trace, wherein the length of delay is determined by counting the number of burst tones occurring during the length of delay.

2. The sampling circuit of claim 1, further comprising an integrator block to extrapolate the length of the delay between the reference signal transmission time and the sensed signal transmission time.

3. The sampling circuit of claim 1, comprising at least one input clock and a sampling clock, wherein the sampling clock generates the burst tones.

4. The sampling circuit of claim 3, wherein the at least one input clock is one input clock.

5. The sampling circuit of claim 3, wherein the at least one input clock comprises two input clocks.

6. The sampling circuit of claim 1, wherein the device to measure a length of delay comprises first and second NAND configured as an SR latch.

7. The sampling circuit of claim 6, further comprising a third NAND wherein the length of delay is determined by counting the number of burst tones occurring during the length of delay.

8. The sampling circuit of claim 1, further comprising a delay circuit in the sensor trace.

9. The sampling circuit of claim 1, further comprising a balanced mixer.

10. The sampling circuit of claim 1, wherein the sensing element comprises a frequency dependent resistor.

11. A system comprising a sensing element and a sampling circuit comprising at least one clock, a reference trace, a sensor trace connected to the sensing element, and a device to measure a length of delay between a reference signal transmission time of a reference signal transmitting through the reference trace and a sensed signal transmission time of a sensed signal transmitting through the sensor trace, wherein the length of delay is determined by counting the number of burst tones occurring during the length of delay.

12. The system of claim 11, further comprising an integrator block to extrapolate the length of the delay between the reference signal transmission time and the sensed signal transmission time.

13. The system of claim 11, comprising at least one input clock and a sampling clock, wherein the sampling clock generates the burst tones.

14. The system of claim 13, wherein the at least one input clock is one input clock.

15. The system of claim 13, wherein the at least one input clock comprises two input clocks.

16. The system of claim 11, wherein the device to measure a length of delay comprises first and second NAND configured as an SR latch.

17. The system of claim 16, further comprising a third NAND wherein the length of delay is determined by counting the number of burst tones occurring during the length of delay.

18. The system of claim 11, further comprising a delay circuit in the sensor trace.

19. The system of claim 11, further comprising a balanced mixer.

20. The system of claim 11, wherein the sensing element comprises a frequency dependent resistor.

21. The system of claim 11, wherein the sensing element is detachable from the sampling circuit or integrally incorporated in the sampling circuit.

22. A method of non-contact sensing comprising obtaining a sampling circuit comprising at least one clock, a reference trace, a sensor trace connected to the sensing element, and a device to measure a length of delay between a reference signal transmission time of a reference signal transmitting through the reference trace and a sensed signal transmission time of a sensed signal transmitting through the sensor trace, and determining the length of delay by counting the number of burst tones occurring during the length of delay.

23. The method of claim 22, wherein the sensing element is detachable from the sampling circuit or integrally incorporated in the sampling circuit.

24. The method of claim 22, wherein an impedance of the sensing element changes as a function of temperature or vibration sensed by the sensing element.

25. The method of claim 24, wherein the length of delay is determined by the change in impedance of the sensing element.

* * * * *